United States Patent Office 2,868,843
Patented Jan. 13, 1959

2,868,843
3,4-DICHLOROPHENOXYALKANOLS

Clarence L. Moyle, Clare, Mich., assignor to The Dow Chemical Company, Midland, Mich., a corporation of Delaware No Drawing. Application May 31, 1956
Serial No. 588,256

3 Claims. (Cl. 260—613)

This invention is directed to 3,4-dichlorophenoxyalkanols having the formula

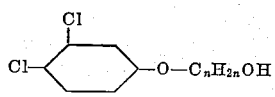

wherein $n$ is an integer from 2 to 3, inclusive. The new compounds are oily liquids soluble in many organic solvents and having only limited solubility in water. They have been found useful as intermediates for the preparation of more complex organic compounds and as coupling agents or cosolvents for increasing the solubility of certain organic compounds in solvents such as toluene, xylene and aromatic petroleum distillates. The compounds of the invention have also been found to have utility as antimicrobial agents for inhibiting the growth of bacteria and fungi and as enzyme inhibitors for decreasing the formation of acid substances by the glycolytic enzymes of saliva.

The 3,4-dichlorophenoxyalkanols may be prepared by any suitable method. In one method of preparation, an alkali metal 3,4-dichlorophenate is reacted with a suitable haloalkanol to produce the desired compound. In such operations, good results are obtained when employing substantially equimolar proportions of the phenate and haloalkanol reactants at moderately elevated temperatures.

In one mode of carrying out the reaction, 3,4-dichlorophenol is dissolved in a slight excess of aqueous sodium hydroxide solution to prepare a solution of sodium 3,4-dichlorophenate and a haloalkanol such as ethylene or propylene chlorohydrin or 3-bromo-1-propanol added thereto while heating at temperatures of from about 60° to 100° C. On completion of the reaction, the desired product is separated by conventional procedures such as washing, decantation and fractional distillation under reduced pressure.

The following examples illustrate the invention but are not to be construed as limiting the same.

Example 1

32.6 grams (0.2 mole) of 3,4-dichlorophenol was dissolved in a mixture of 30 milliliters of water and 35.3 milliliters of aqueous 20 percent sodium hydroxide solution (0.21 moles of NaOH). To the resulting solution 17.7 grams (0.22 mole) of ethylene chlorohydrin was added portionwise with stirring during a period of 13 minutes while maintaining the reaction mixture at temperatures of from 64° to 85° C. Following the addition, stirring was continued and the reaction mixture heated at temperatures of from 85° to 91° C. for a further period of 1.75 hours to complete the reaction. During the above operations, the reaction mixture separated into an oily organic layer and an aqueous layer. On completion of the reaction, the organic layer was separated, washed thoroughly with aqueous sodium hydroxide solution and distilled under reduced pressure to obtain a 2-(3,4-dichlorophenoxy) ethanol product, boiling at 136° C. under 6 millimeters' pressure. The product was a colorless, oily liquid having a density of 1.39 at 29° C. and a refractive index ($n$/D) of 1.5601 at 35° C.

Example 2

24 grams (0.15 mole) of 3,4-dichlorophenol was dissolved in 31.7 milliliters of aqueous 20 percent sodium hydroxide solution and 18.5 grams (0.188 mole) of aqueous 95.7 percent propylene chlorohydrin added thereto portionwise with stirring while heating at temperatures of 73° to 99° C. The reaction mixture was maintained in the above temperature range for a period of about 2 hours to complete the reaction. The crude product, consisting of an aqueous layer and an oily organic layer, was cooled and mixed with methylene dichloride. The resulting organic layer, consisting of a methylene dichloride solution of the crude product, was separated from the aqueous layer, washed thoroughly with dilute aqueous sodium hydroxide solution and is fractionally distilled under reduced pressure to obtain a 1-(3,4-dichlorophenoxy)-2-propanol product as an oily liquid boiling at 168°–169° C. under 10 millimeters' pressure. This product had a density of 1.32 at 26° C. and a refractive index ($n$/D) of 1.5473 at 35° C.

In a similar fashion, 3,4-dichlorophenates are reacted with 2-bromo-1-propanol and 3-chloro-1-propanol to prepare 2-(3,4-dichlorophenoxy)-1-propanol and 3-(3,4-dichlorophenoxy)-1-propanol, respectively.

In representative anti-microbial operations, 2-(3,4-dichlorophenoxy) ethanol and 1-(3,4-dichlorophenoxy)-2-propanol were separately dispersed in nutrient agar media to prepare series of media containing 0.05 percent by weight of one of the alkanols. Separate portions of each such medium were inoculated by streaking with cultures of *Staphylococcus aureus*, *Salmonella typhosa*, *Aspergillus terreus* and *Rhizopus nigricans* and the resulting inoculated media incubated for 48 to 72 hours under temperatures conductive to the growth of the organism concerned. Similar media without any 3,4-dichlorophenoxyalkanol ingredient were similarly inoculated and incubated to serve as checks. On observation after incubation it was found that the organisms had made vigorous growth on the check media while growth of each organism was completely inhibited on the media containing the 3,4-dichlorophenoxyalkanol compounds.

In further determinations, 2-(3,4-dichlorophenoxy)-ethanol and 1-(3,4-dichlorophenoxy)-2-propanol were found to be highly effective in inhibiting acid formation from glycolysis of glucose by enzymes in saliva sediment, determined by the method described by R. S. Manly in Journal of Dental Research, volume 33, No. 4, pages 561–570 (August 1954).

I claim:

1. 3,4-dichlorophenoxyalkanols having the formula

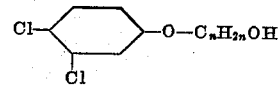

wherein $n$ is an integer from 2 to 3, inclusive.
2. 2-(3,4-dichlorophenoxy) ethanol.
3. 1-(3,4-dichlorophenoxy)-2-propanol.

References Cited in the file of this patent
UNITED STATES PATENTS
2,133,972   Coleman et al. _____ Oct. 25, 1938

OTHER REFERENCES
Frear: Chemistry of the Pesticides (1955), p. 229.